(12) United States Patent
An et al.

(10) Patent No.: US 10,854,135 B2
(45) Date of Patent: Dec. 1, 2020

(54) DISPLAY DEVICE

(71) Applicant: Samsung Display Co., Ltd., Yongin-si (KR)

(72) Inventors: Hyung Jun An, Yongin-si (KR); Hyea Weon Shin, Yongin-si (KR); Min Ji Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/543,361

(22) Filed: Aug. 16, 2019

(65) Prior Publication Data

US 2020/0251045 A1 Aug. 6, 2020

(30) Foreign Application Priority Data

Jan. 31, 2019 (KR) .................. 10-2019-0012792

(51) Int. Cl.
*G09G 3/32* (2016.01)
*H02H 1/00* (2006.01)
*H02H 7/20* (2006.01)

(52) U.S. Cl.
CPC ............ *G09G 3/32* (2013.01); *H02H 1/0007* (2013.01); *H02H 7/20* (2013.01); *G09G 2320/0673* (2013.01); *G09G 2330/021* (2013.01); *G09G 2330/045* (2013.01); *G09G 2360/16* (2013.01)

(58) Field of Classification Search
CPC ................ G09G 3/32; G09G 2360/16; G09G 2320/0673; G09G 2330/045; G09G 2330/021; H02H 1/0007; H02H 7/20
See application file for complete search history.

(56) References Cited

U.S. PATENT DOCUMENTS

| | | | | |
|---|---|---|---|---|
| 8,269,702 B2 * | 9/2012 | Kim | ..................... | G09G 3/3233 345/77 |
| 2011/0115830 A1 * | 5/2011 | Lee | ..................... | G09G 3/3233 345/690 |
| 2011/0316893 A1 * | 12/2011 | Lee | ..................... | G09G 3/3208 345/690 |
| 2012/0044271 A1 | 2/2012 | Lee et al. | | |

(Continued)

FOREIGN PATENT DOCUMENTS

| KR | 10-0590241 B1 | 6/2006 |
|---|---|---|
| KR | 10-1124108 B1 | 3/2012 |

(Continued)

*Primary Examiner* — Ryan A Lubit
(74) *Attorney, Agent, or Firm* — Lewis Roca Rothgerber Christie LLP

(57) ABSTRACT

A display device includes a display panel having a display area and pixels at the display area, a power supply configured to supply a first power source voltage to the pixels through a first power line extending to the display area, and to supply a second power source voltage lower than the first power source voltage to the pixels through a second power line including first and second side power lines extending in first and second peripheral areas located at first and second sides of the display area of the display panel, a sensor configured to detect first and second detection values corresponding to currents of the first and second side power lines, and a controller configured to control an operation of the power supply, based on a difference between the first detection value and the second detection value.

17 Claims, 11 Drawing Sheets

(56) References Cited

U.S. PATENT DOCUMENTS

| | | | | |
|---|---|---|---|---|
| 2012/0175961 A1* | 7/2012 | Har-Shai | ........... | H01L 31/02021 307/80 |
| 2014/0009512 A1* | 1/2014 | Lee | ...................... | G09G 3/3283 345/690 |
| 2015/0170577 A1* | 6/2015 | Bae | ...................... | G09G 3/3233 345/212 |
| 2016/0155382 A1* | 6/2016 | Cheon | .................. | G09G 3/3225 345/690 |
| 2016/0203765 A1* | 7/2016 | Lee | ...................... | G09G 3/3291 345/76 |
| 2016/0314761 A1* | 10/2016 | Kim | ........................ | G09G 5/10 |
| 2018/0239379 A1* | 8/2018 | Zhang | ...................... | G05F 1/10 |
| 2018/0261993 A1* | 9/2018 | Kurniawan | ............ | H02H 3/162 |
| 2019/0088205 A1* | 3/2019 | Zhang | .................. | G09G 3/3258 |

FOREIGN PATENT DOCUMENTS

| | | |
|---|---|---|
| KR | 10-1368726 B1 | 3/2014 |
| KR | 10-2016-0027534 A | 3/2016 |
| KR | 10-2018-0042568 A | 4/2018 |

\* cited by examiner

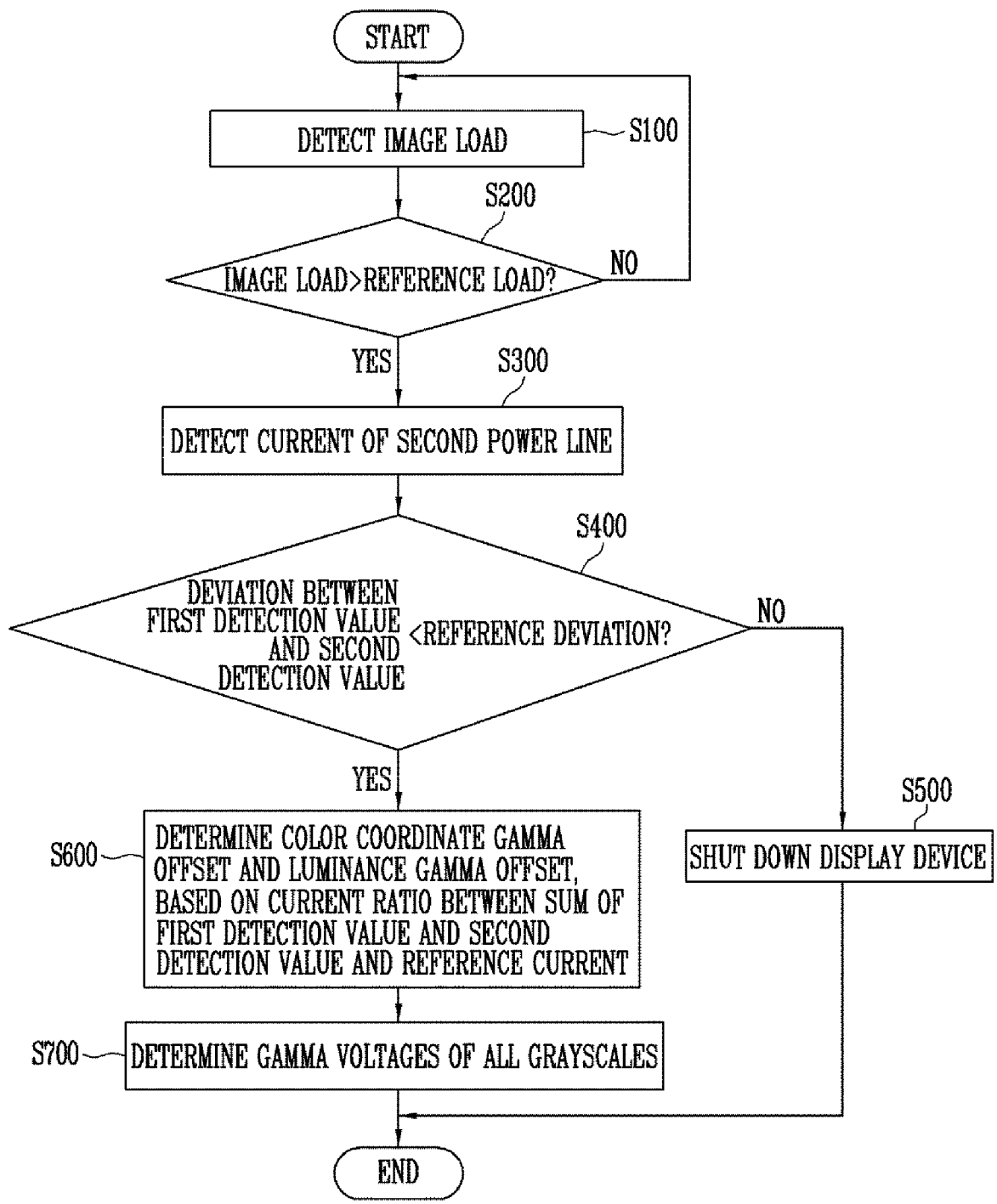

DISPLAY DEVICE

CROSS-REFERENCE TO RELATED APPLICATION

This application claims priority to and the benefit of Korean patent application 10-2019-0012792 filed on Jan. 31, 2019 in the Korean Intellectual Property Office, the entire disclosure of which is incorporated herein by reference.

BACKGROUND

1. Field

Aspects of the present disclosure generally relates to a display device.

2. Related Art

As elements constituting a display device are used for a long time, the elements may gradually degrade. Additionally, characteristics of the elements may be changed by external ultraviolet light, sunlight, etc., and electrical currents flowing through the display panel, corresponding to the same image data, may be changed. As a result, a luminance and/or a color coordinate of the display device used for a long time may be changed from an initially set luminance and/or an initially set color coordinate.

In addition, an overcurrent is supplied to the display panel due to a crack, a line short circuit, etc. of the display panel, and therefore, an element of the display device may be degraded or broken due to generation of heat.

SUMMARY

Aspects of embodiments of the present disclosure are directed to a display device for controlling an operation of a power supply, based on currents respectively detected from a first side power line and a second side power line.

Aspects of embodiments of the present disclosure are also directed to a display device for changing a gamma setting for compensating a color coordinate and/or a luminance, based on a current detected from a power line, and for controlling an operation of a power supply.

According to some embodiments of the present disclosure, there is provided a display device including: a display panel having a display area and including a plurality of pixels at the display area; a power supply configured to supply a first power source voltage to the pixels through a first power line extending to the display area, and to supply a second power source voltage lower than the first power source voltage to the pixels through a second power line including a first side power line extending in a first peripheral area located at a first side of the display area of the display panel and a second side power line extending in a second peripheral area located at a second side of the display area of the display panel; a sensor configured to detect a first detection value and a second detection value; and a controller configured to control an operation of the power supply, based on a difference between the first detection value and the second detection value. The first detection value may be a current of the first side power line and the second detection value may be a current of the second side power line.

In some embodiments, the controller includes: a power supply controller configured to shut down the power supply, when the difference between the first detection value and the second detection value exceeds a reference difference.

In some embodiments, the controller is provided on a first substrate overlapping with a portion of the display panel, and the power supply is provided on a second substrate overlapping with a portion of the first substrate.

In some embodiments, the second power line branches off into the first side power line and the second side power line on the second substrate.

In some embodiments, the sensor is on the first substrate or the second substrate.

In some embodiments, the sensor includes: a first sensor electrically coupled to the first side power line, and configured to detect the first detection value; and a second sensor electrically coupled to the second side power line, and configured to detect the second detection value.

In some embodiments, the controller is configured to change a gamma setting, based on a relative current difference between a reference current and a sum of the first detection value and the second detection value.

In some embodiments, the controller includes: a load detector configured to detect an image load based on image data of one frame; an offset determiner configured to determine a color coordinate gamma offset and a luminance gamma offset of each of reference grayscale values, based on the relative current difference; and a gamma voltage adjustor configured to determine gamma voltages of all grayscale values based on the color coordinate gamma offset and the luminance gamma offset.

In some embodiments, the offset determiner includes: a current ratio calculator configured to calculate the relative current difference based on the reference current corresponding to the image load and the second detection value; a first offset calculator configured to calculate the color coordinate gamma offset by applying the relative current difference to a current color coordinate corresponding to each of the reference grayscale values; and a second offset calculator configured to calculate the luminance gamma offset by applying the relative current difference to a current luminance corresponding to each of the reference grayscale values.

In some embodiments, the load detector compares the image load with a reference load, and drives the offset determiner when the image load is larger than the reference load.

According to some embodiments of the present disclosure, there is provided a display device including: a display panel having a display area and including a plurality of pixels at the display area; a power supply configured to supply a first power source voltage to the pixels through a first power line, and supply a second power source voltage lower than the first power source voltage to the pixels through a second power line; a sensor configured to detect a current of the second power line; a data driver configured to supply a data signal to the pixels; and a controller configured to change a gamma setting corresponding to the data signal, based on a relative current difference between a reference current and the detected current, and to control an operation of the power supply, based on a current difference between positions of the detected current.

In some embodiments, the second power line includes: a first side power line extending in a first peripheral area located at a first side of the display area of the display panel; and a second side power line extending in a second peripheral area located at a second side of the display area of the display panel.

In some embodiments, the display area is located between the first peripheral area and the second peripheral area.

In some embodiments, the sensor includes: a first sensor electrically coupled to the first side power line, and configured to detect a first detection value corresponding to a current of the first side power line; and a second sensor electrically coupled to the second side power line and configured to detect a second detection value corresponding to a current of the second side power line.

In some embodiments, the controller includes: a power supply controller configured to shut down the power supply, when a difference between the first detection value and the second detection value exceeds a reference difference.

In some embodiments, the controller includes: a load detector configured to detect an image load based on image data of one frame; an offset determiner configured to determine a color coordinate gamma offset and a luminance gamma offset of each of reference grayscale values, based on the relative current difference; and a gamma voltage adjustor configured to determine gamma voltages of all grayscale values based on the color coordinate gamma offset and the luminance gamma offset of each of reference grayscale values.

In some embodiments, the offset determiner includes: a current ratio calculator configured to calculate the relative current difference based on the reference current corresponding to the image load and the detected current; a first offset calculator configured to calculate the color coordinate gamma offset by applying the relative current difference to a current color coordinate corresponding to each of the reference grayscale values; and a second offset calculator configured to calculate the luminance gamma offset by applying the relative current difference to a current luminance corresponding to each of the reference grayscale values.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. Like reference numerals refer to like elements throughout.

FIG. 12 is a flow diagram illustrating an example of a driving method of a display device according to an embodiment of the present disclosure.

DETAILED DESCRIPTION

Figure 1:
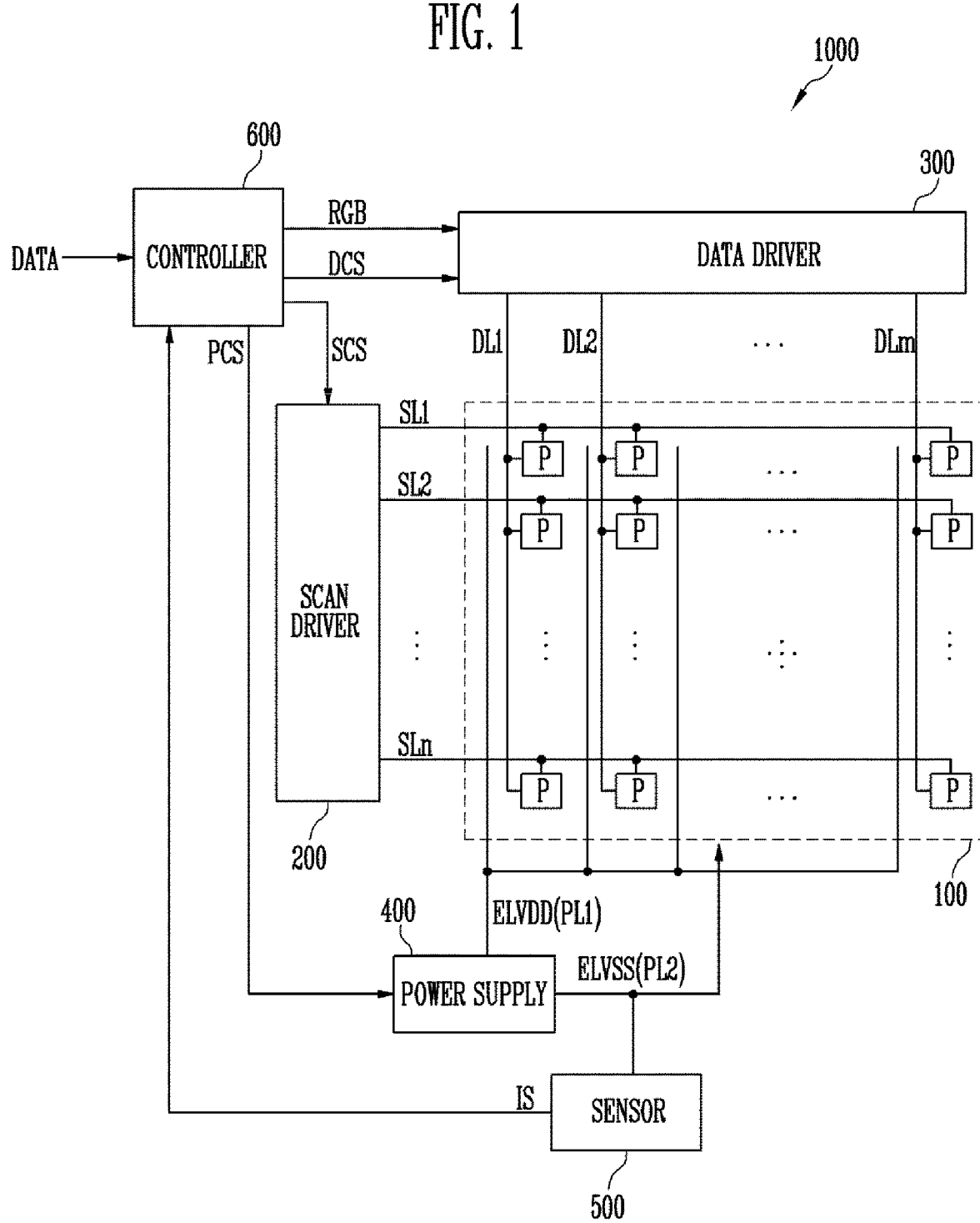
FIG. 1 is a block diagram illustrating a display device according to an embodiment of the present disclosure.

Hereinafter, exemplary embodiments of the present disclosure will be described in more detail with reference to the accompanying drawings. Throughout the drawings, the same reference numerals are given to the same elements, and their repeat descriptions may be omitted.

Figure 2:
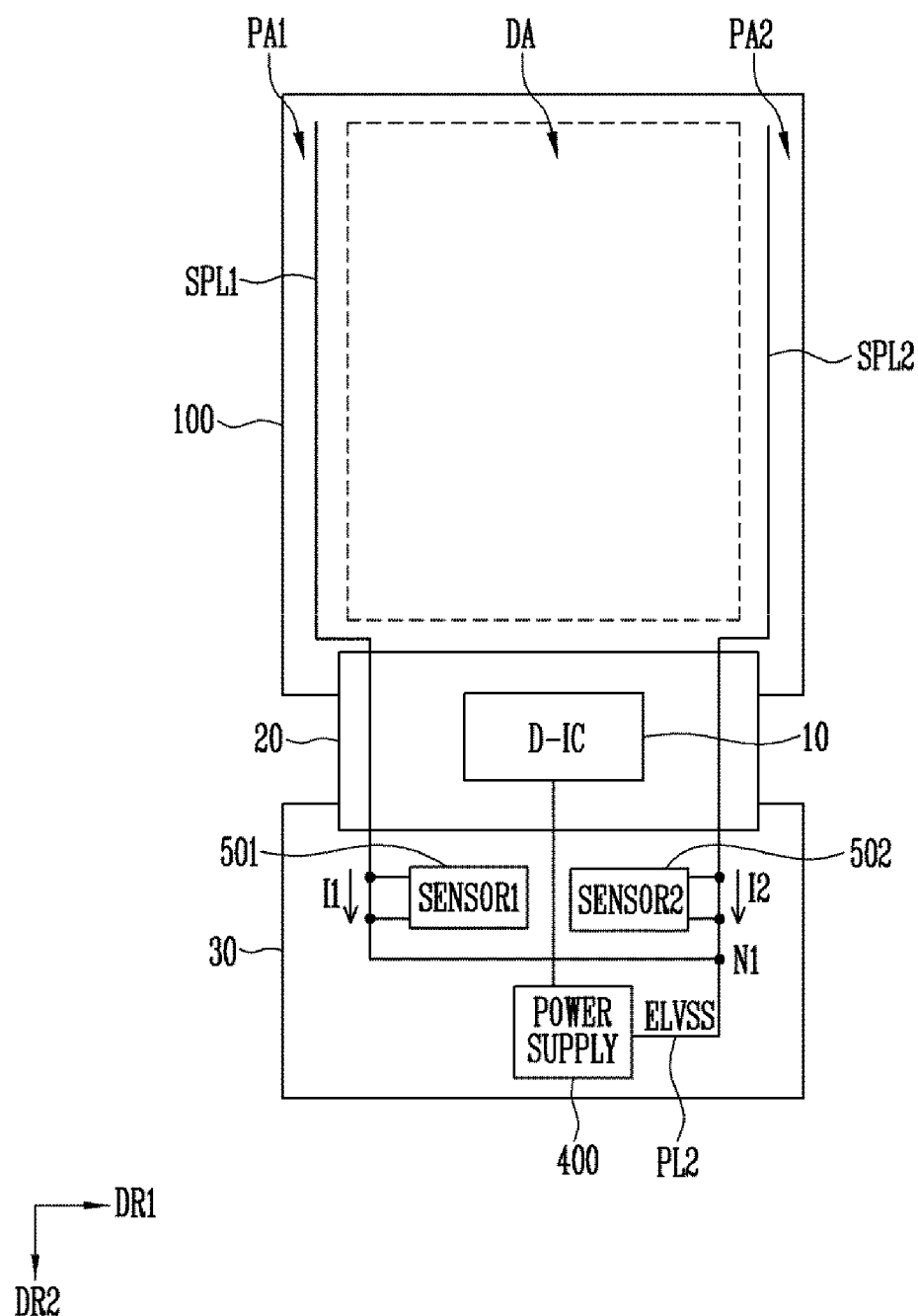
FIG. 2 is a diagram illustrating an example of the display device shown in FIG. 1.

FIG. 1 is a block diagram illustrating a display device according to an embodiment of the present disclosure. FIG. 2 is a diagram illustrating an example of the display device shown in FIG. 1.

Referring to FIGS. 1 and 2, the display device 1000 may include a display panel 100, a scan driver 200, a data driver 300, a power supply 400, a sensor 500, and a controller 600.

The display device 1000 may be a flat panel display device, a flexible display device, a curved display device, a foldable display device, or a bendable display device. Also, the display device 1000 may be applied to a transparent display device, a mirror display device, a head-mounted display device, a wearable display device, and the like.

A display panel 100 may include a plurality of scan lines SL1 to SLn, a plurality of data lines DL1 to DLm, and a plurality of pixels P respectively physically and electrically coupled to the scan lines SL1 to SLn and the data lines DL1 to DLm (n and m are integers larger than 1). Each of the pixels P may include a light emitting device, a driving transistor, and at least one switching transistor. The light emitting device may include an organic light emitting diode or an inorganic light emitting device including an inorganic light emitting material.

The display panel 100 may include a display area DA including the pixels P and peripheral areas PA1 and PA2 of the display area DA. For example, a first peripheral area PA1 and a second peripheral area PA2 may be respectively located at both sides of the display area DA in a first direction DR1. Various types of conductive lines for driving the pixels P may be disposed in the peripheral areas.

The scan driver 200 may provide a scan signal to the scan lines SL1 to SLn, based on a scan control signal SCS provided from the controller 600.

The data driver 300 may provide a data signal (e.g., a data voltage) to the data lines DL1 to DLm, based on a data control signal DCS and red, green, and blue (RGB) data RGB, which are provided from the controller 600. For example, the data driver 300 may convert digital RGB data RGB into an analog data voltage, based on a gamma voltage corresponding to each grayscale value.

The power supply 400 may generate a first power source voltage ELVDD and a second power source voltage ELVSS, based on a power control signal PCS. The first power source voltage ELVDD may be a driving voltage supplied to one electrode of the driving transistor of the pixel P, and the second power source voltage ELVSS may be a common voltage supplied to a cathode electrode of the light emitting device of the pixel P. In an embodiment, the voltage of the second power source voltage ELVSS may be lower than that of the first power source voltage ELVDD.

The first power source voltage ELVDD may be supplied to the pixels P through a first power line PL1. The first power line PL1 may extend to the display area DA. For example, the first power line PL1 may include a plurality of conductive patterns extending in a second direction DR2 in the display area DA. In some examples, the first power line PL1 may be disposed in a mesh structure in the display area DA.

The second power source voltage ELVSS may be supplied to the pixels P through a second power line PL2. The second power line PL2 may include (e.g., branch off into) a first side power line SPL1 extending in the first peripheral area PA1 and a second side power line SPL2 extending in the second peripheral area PA2.

In an embodiment, the first side power line SPL1 and the second side power line SPL2 may be electrically coupled to a common electrode (e.g., the cathode electrode of the light emitting device) commonly disposed in the display area DA. When an image is displayed, current flows in the second power line PL2 through the first power line PL1. When the current of the second power line PL2 is divided in the first side power line SPL1 and the second side power line SPL2, heat generation of the display panel 100 due to image display can be reduced or minimized.

The sensor 500 may be electrically coupled to the second power line PL2. The sensor 500 may detect a current of the second power line PL2. In an embodiment, as shown in FIG. 2, the sensor 500 may be electrically coupled to each of the first side power line SPL1 and the second side power line SPL2.

For example, the sensor 500 may include a first sensor 501 electrically coupled to the first side power line SPL1 and a second sensor 502 electrically coupled to the second side power line SPL2. The first sensor 501 may detect a first detection value. For example, the first detection value may be a current I1 of the first side power line SPL1. The second sensor 502 may detect a second detection value. For example, the second detection value may be a current I2 of the second side power line SPL2. A defect such as a crack of the display device 1000, a short circuit between lines, or a disconnection of lines may be predicted based on the first and second detection values.

In an embodiment, the first sensor 501 and the second sensor 502 may be disposed on a second substrate 30 on which the power supply 400 is disposed.

Figure 5:
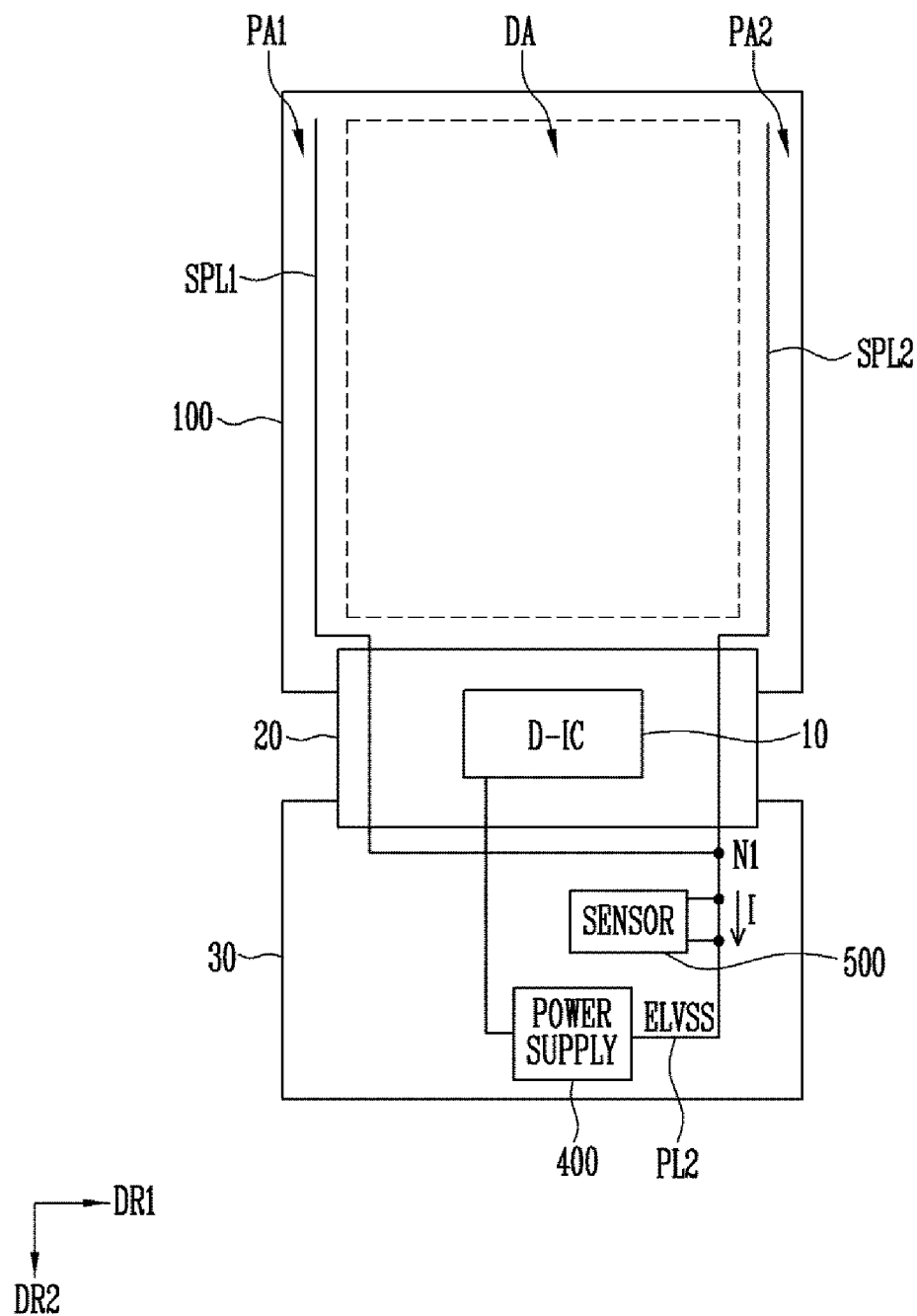
FIG. 5 is a diagram illustrating an example of the display device shown in FIG. 1.

However, this is merely illustrative, and the sensor 500 may detect a current in the second power line PL2 before branching off into a first side power line SPL1 extending in the first peripheral area PA1 and a second side power line SPL2 extending in the second peripheral area PA2 (as, e.g., shown in FIG. 5). A change in characteristic of the display panel 100 and/or the pixels P with a use time of the display device may be predicted.

The controller 600 may control an operation of the power supply 400, based on a difference between the first detection value and the second detection value. For example, when the difference between the first detection value and the second detection value exceeds a reference difference (e.g., a preset reference difference), the controller 600 may shut down the power supply 400. Accordingly, display of the display device 1000 may be shut down. That is, when a difference between currents at left and right sides of the second power line PL2 is large, a protective function for protecting the display panel 100 and internal elements may be performed.

In an embodiment, the controller 600 may further include a timing controller that receives image data DATA, a vertical synchronization signal, a horizontal synchronization signal, a main clock signal, a data enable signal, and the like from an external graphic controller, and generates a scan control signal SCS, a data control signal DCS, and RGB data RGB corresponding to the image data, based on these signals.

In an embodiment, the data driver 300 and the controller 600 may be implemented with one driver integrated circuit (IC), but this is merely illustrative. When a plurality of data drivers are utilized, each of the plurality of driver ICs may include the data driver 300, and the controller 600 may separately exist to control the plurality of driver ICs.

In an embodiment, as shown in FIG. 2, the display device 1000 may be configured with the display panel 100, a first substrate 20, and the second substrate 30.

The first substrate 20 may be a source circuit board disposed adjacent to one side portion of the display panel 100. The first substrate 20 may be electrically coupled to the display panel 100 in the form of any one of a Chip On Film (COF) and a Tape Carrier Package (TCP).

A driver IC 10 may be included in the first substrate 20. In an embodiment, the driver IC 10 may include at least some components of the data driver 300 and the controller 600.

The second substrate 30 is located at the outside of the display panel 100, and may be a power circuit board including the power supply 400. In an embodiment, the power supply 400 may be configured in the form of a Power Management IC (PMIC). A memory, the sensor 500, and the like may be further disposed on the second substrate 30. The first substrate 20 and the second substrate 30 may be electrically coupled to each other through conductive lines.

In an embodiment, as shown in FIG. 2, the second power line PL2 may branch off into the first side power line SPL1 and the second side power line SPL2 on the second substrate 30. The first side power line SPL1 and the second side power line SPL2, which are branched off at a first node N1 of the second substrate 30, may respectively extend to the first peripheral area PA1 and the second peripheral area PA2 via the first substrate 20.

In an embodiment, the first sensor 501 and the second sensor 502 may be respectively electrically coupled to the first side power line SPL1 and the second side power line SPL2 on the second substrate 30.

The controller 600 may determine whether the power supply 400 and the display device 1000 are to be driven, based on a difference between the detected currents I1 and I2.

Figure 3:
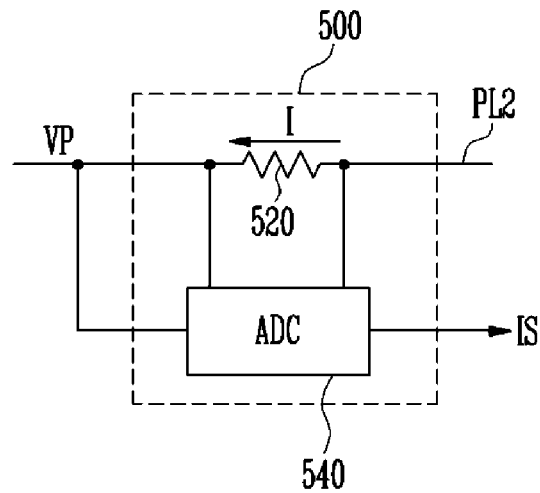
FIG. 3 is a diagram illustrating an example of a sensor included in the display device shown in FIG. 1.

FIG. 3 is a diagram illustrating an example of the sensor included in the display device shown in FIG. 1.

Referring to FIGS. 1 to 3, the sensor 500 may include a sensing resistor 520 and an Analog-to-Digital Converter (ADC) 540.

The sensing resistor 520 may be formed on the second power line PL2 of the power supply 400. The sensor 500 may sense a current I flowing in the second power line PL2, resulting from a voltage formed between both ends of the sensing resistor 520. The sensor 500 may further include an amplifier. The amplifier may amplify the voltage formed between both ends of the sensing resistor 520 and provide the amplified voltage to the ADC 540.

The ADC 540 may generate a detection value IS as a current of the second power line PL2 by converting a power voltage VP provided to the second power line PL2 and the voltage formed between both ends of the sensing resistor 520 into digital signals. The detection value IS generated from the sensor 500 may be provided to the controller 600.

However, this is merely illustrative, and the configuration of the sensor 500 is not limited thereto. The sensor 500 may be implemented with various suitable current sensors or voltage sensors known in the art.

Figure 4:
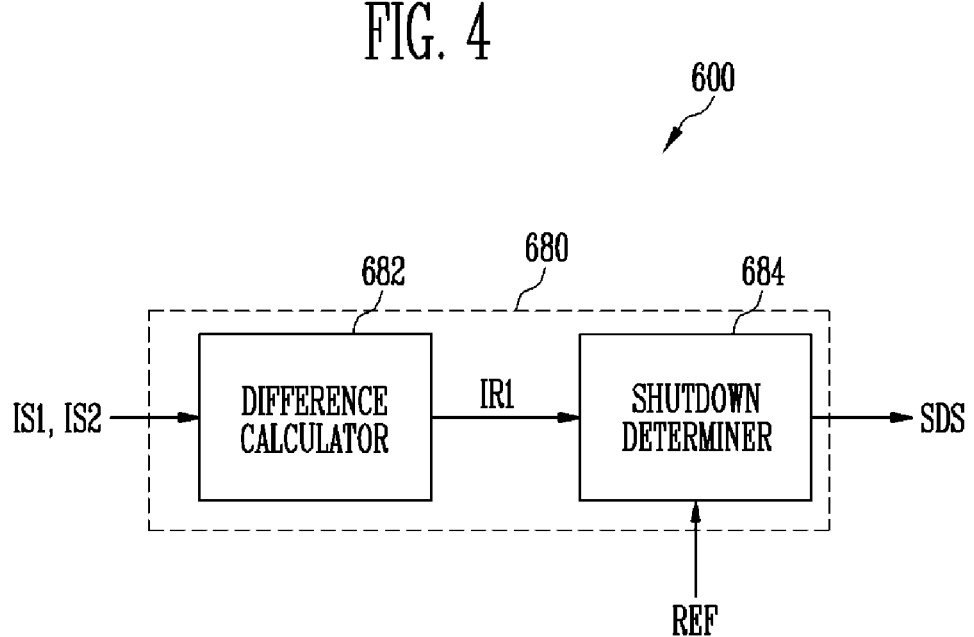
FIG. 4 is a block diagram illustrating an example of a controller included in the display device shown in FIG. 1.

FIG. 4 is a block diagram illustrating an example of the controller included in the display device shown in FIG. 1.

Referring to FIGS. 1, 2, and 4, the controller 600 may include a power supply controller 680 that shuts down driving of the power supply 400 and/or the display device 1000, based on a difference between currents detected from a power line.

In an embodiment, the power supply controller 680 may include a difference calculator 682 that calculates a current difference IR1 between a first detection value IS1 and a second detection value IS2 and a shutdown determiner 684 that determines whether the power supply 400 and/or the display device 1000 are to be driven. The first detection value IS1 may correspond to a detection value of the current I1 of the first side power line SPL1. The second detection value IS2 may correspond to a detection value of the current I2 of the second side power line SPL2.

The difference calculator 682 may calculate at least one of a current difference or a relative current difference (e.g., expressed in percentage) of the first detection value IS1 and the second detection value IS2. For example, when the first detection value IS1 is 1 A (Ampere) and the second detection value IS2 is 1.1 A, the current difference IR1 may be 0.1 A or 10%.

The difference calculator 682 may include various suitable hardware components and/or software components for calculating the current difference IR1 by using analog values or digital values, which correspond to currents.

The current difference IR1 is generated by a resistance difference, etc. between the first side power line SPL1 and the second side power line SPL2, which are respectively disposed at both sides of the display area DA. Also, the current difference IR1 may be increased by damage, short circuit, disconnection, etc. of any one of the first side power line SPL1 and the second side power line SPL2.

When current of the power line is biased to one side, heat generation is increased in a local area of the display panel 100, and degradation may be accelerated. In order to prevent or reduce such a panel defect, the shutdown determiner 684 may determine whether the power supply 400 and/or the display device 1000 are/is to be driven.

The shutdown determiner 684 may output a shutdown signal SDS for shutting down the power supply 400, based on a result obtained by comparing the current difference IR1 with a reference difference (e.g., a preset reference difference) REF. When the current difference IR1 exceeds to the reference difference REF, the power supply 400 may output the shutdown signal SDS. For example, when the current difference IR1 is about 20% or more, the shutdown signal SDS may be output. However, this is merely illustrative, and the reference difference is not limited thereto.

When the current difference IR1 is the reference difference REF or less, the power supply 400 and the display device 1000 may normally operate.

The shutdown signal SDS may stop the driving of the power supply 400. However, this is merely illustrative, and the shutdown signal SDS may stop the driving of at least some of the components included in the display device 1000 such that the display device 1000 does not display any image.

As described above, the display device 1000 according to example embodiments may control the driving of the power supply 400 and the display device 1000 based on the current difference IR1 between the first side power line SPL1 and the second side power line SPL2, so that degradation and damage of the display panel 100 due to current asymmetry between the first side power line SPL1 and the second side power line SPL2 can be prevented or reduced.

FIG. 5 is a diagram illustrating an example of the display device shown in FIG. 1.

In FIG. 5, components identical or substantially similar to those described with reference to FIGS. 1 and 2 are designated by like reference numerals, and their repeat descriptions may be omitted. In addition, a display device shown in FIG. 5 may have a configuration substantially identical or similar to the display device shown in FIG. 2, except for the position of a sensor and some functions of a controller.

Referring to FIGS. 1, 2, and 5, the display device may be configured with a display panel 100, a first substrate 20, and a second substrate 30. Also, the display device may include a display panel 100, a scan driver 200, a data driver 300, a power supply 400, a sensor 500, and a controller 600.

In an embodiment, the sensor 500 may be electrically coupled to a second power line PL2 that does not branch off (i.e., before branching off into seperate first and second side power lines SPL1 and SPL2) to detect a current of the second power line PL2. When the use time of the display device 1000 elapses, the value of current I detected from the second power line PL2 may be changed with respect to the same image load.

The controller 600 may change a gamma setting corresponding to a data signal, based on a relative current difference between the detected current and a preset reference current (which may be expressed as a difference between the detected and preset currents divided by the preset reference current). The controller 600 may adjust a gamma voltage corresponding to a grayscale value, based on the change in the detected current I. Accordingly, a change in color coordinate and/or a change in luminance when the use time of the display device 1000 elapses can be compensated.

Figure 6:
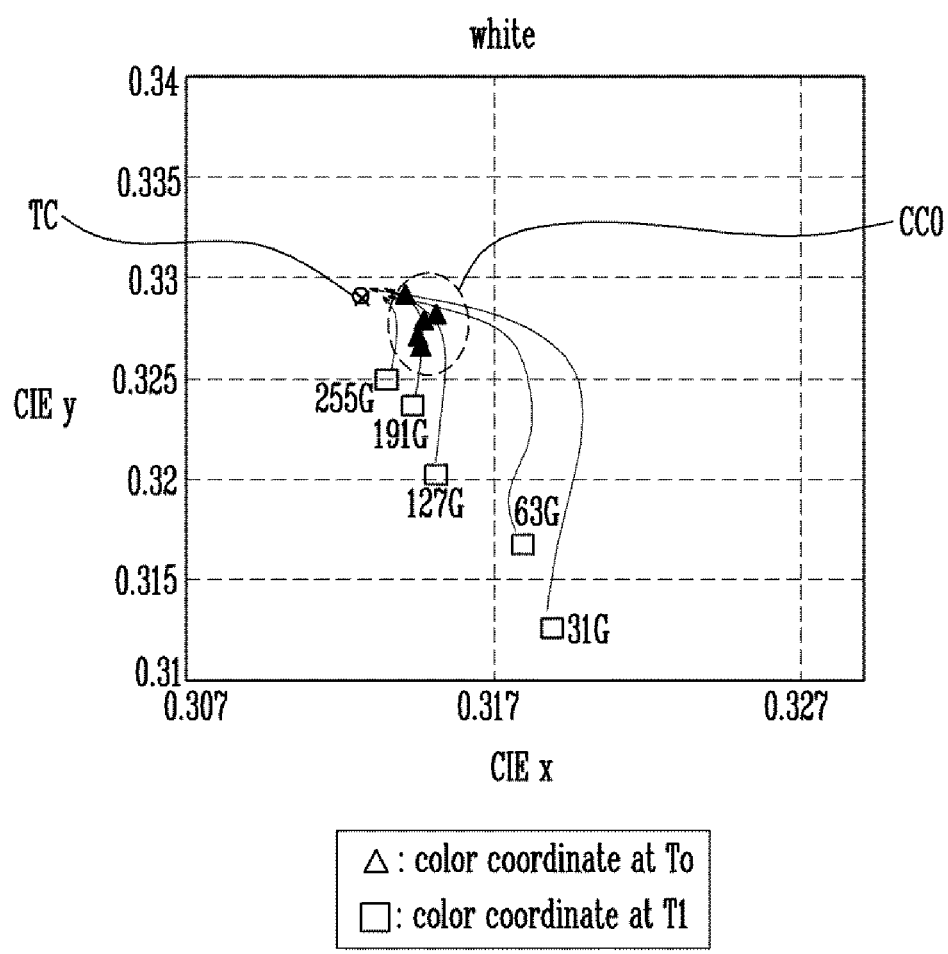
FIG. 6 is a diagram illustrating an example of a color coordinate being changed by use of the display device.
Figure 7A:
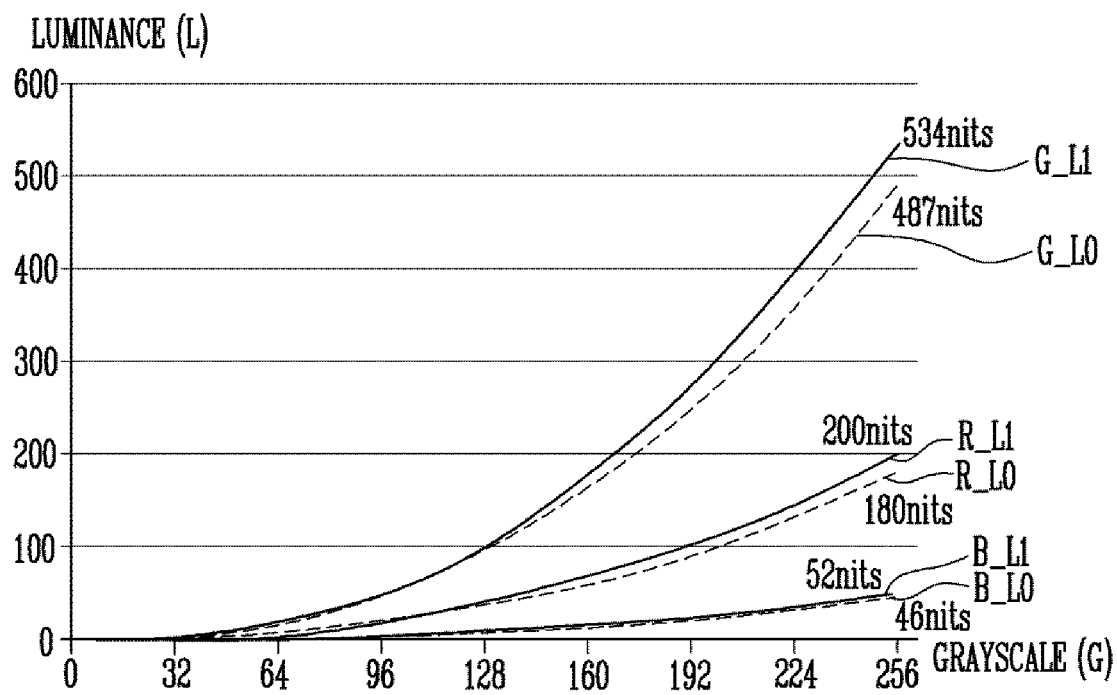
FIGS. 7A-7B are diagrams illustrating examples of luminance and current of a power line that are changed by use of the display device.
Figure 7B:
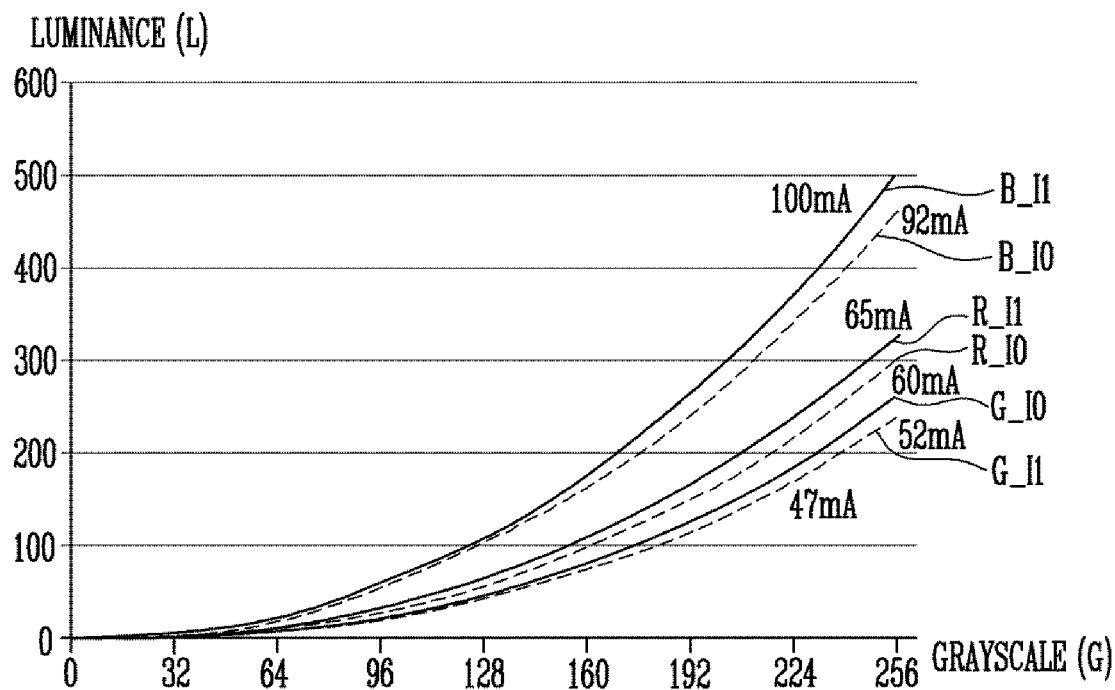

FIG. 6 is a diagram illustrating an example of a color coordinate being changed by use of the display device. FIGS. 7A and 7B are diagrams illustrating examples of luminance and current of a power line that are changed by use of the display device.

Referring to FIGS. 5 to 7B, color coordinate, luminance, and current of the second power line PL2 may be changed when the use time of the display device 1000 elapses.

FIG. 6 illustrates a change in color coordinate for each grayscale value at time T1 with respect to an initially set reference color coordinate CC0 in the color coordinate in white. For example, T1 may be a time when about 100 hours elapses from T0.

The color coordinate means a coordinate in a color space that is a space mathematically defined to express colors, and therefore, a color displayed by the display panel 100 may have a color coordinate in the color space. In exemplary embodiments, a color displayed by the display panel 100 may correspond to a color coordinate included in a CIE 1931 color space.

As shown in FIG. 6, the color coordinate for each grayscale value may be shifted in a downward or right downward direction when time elapses. In particular, when grayscale value is decreased, a variation in color coordinate may be increased.

The controller 600 may correct the shifted color coordinate of white to the level of a target color coordinate TC by compensating for a change in the color coordinate of white when time elapses. The target color coordinate TC may have a value substantially equal or similar to that of the initial reference color coordinate CC0. The corrected color coordinate may be determined based on a change ratio between currents of the second power line PL2.

The controller 600 may generate a color coordinate gamma offset with respect to a corresponding grayscale value (e.g., a reference grayscale value), using the corrected color coordinate generated by reflecting the change in color coordinate. The controller 600 may adjust a gamma voltage by applying the color coordinate gamma offset to a gamma voltage of the reference grayscale value.

For example, when a color coordinate (x, y) of reference grayscale value 31 is changed to a color coordinate (x+a, y−b) at the time T1 due to the color coordinate shift shown in FIG. 6, the color coordinate (x+a, y−b) at the time T1 is corrected to have a value approximate to the color coordinate (x, y). Such color coordinate correction may be determined according to a relative current difference between currents detected from the second power line PL2 with respect to a reference current corresponding to a set or predetermined reference grayscale value.

The controller 600 may generate a color coordinate gamma offset corresponding to the color coordinate correction. Accordingly, the color coordinate gamma offset is applied to a gamma voltage corresponding to the grayscale value 31, so that the gamma voltage corresponding to the grayscale value 31 can be corrected at the time T1. Thus, a change in color coordinate corresponding to the grayscale value 31 can be suppressed even when the use time of the display device 1000 elapses.

In an embodiment, a correction value of each of color coordinates of inherent single colors (e.g., red, blue, and green) of pixels may be determined from the corrected color coordinate of white. A method of calculating the color coordinates of the single colors may be performed using various suitable methods known in the art.

A variation in color coordinate corresponding to a low grayscale value is relatively larger than that in color coordinate corresponding to a high grayscale value, and therefore, a color coordinate gamma offset of the low grayscale value may be larger than that of the high grayscale value.

Meanwhile, as shown in FIG. 7A, differences may occur between initial luminances G_L0, R_L0, and B_L0 and luminances G_L1, R_L1, and B_L1 at the time T1 with respect to the same grayscale value. FIG. 7A illustrates changes in luminance of a green image, a red image, and a blue image. In addition, as shown in FIG. 7B, differences may occur between initial second power line currents G_I0, R_I0, and B_I0 and second power line currents G_I1, R_I1, and B_I1 at the time T1. For example, when time elapses, current flowing in the second power line PL2 is increased due to a change in characteristic of a transistor included in the pixel P, and accordingly, the luminance of an image may be increased. That is, the luminance of the image may be roughly in proportion to a change in current flowing in the second power line PL2. In addition, changes in luminance and current corresponding to the high grayscale value may be relatively larger than those in luminance and current corresponding to the low grayscale value.

The gamma voltage at the time T1 is to be adjusted such that the luminance of an image is decreased with respect to the same grayscale value. However, this is merely illustrative. Although a case where current and luminance increase when time elapses is illustrated in FIGS. 7A and 7B, the current and luminance may decrease when time elapses. The gamma voltage at the time T1 may be adjusted such that the luminance of an image is increased with respect to the same grayscale value.

For example, when a reference luminance L of the reference grayscale value 31 is changed to L′ at the time T1, the luminance L′ at the time T1 is corrected to have a value approximate to the reference luminance L. Such luminance correction may be determined according to a relative current difference between the reference current corresponding to the set or predetermined reference grayscale value and the current detected from the second power line PL2.

The controller 600 may generate a luminance gamma offset corresponding to the luminance correction. Accordingly, the luminance gamma offset is applied to the gamma voltage corresponding to the grayscale value 31, so that the gamma voltage corresponding to the grayscale value 31 at the time T1 can be corrected. Thus, although the use time of the display device 1000 elapses, luminance corresponding to the grayscale value 31 can be maintained to a constant value.

The luminance gamma offset may be set corresponding to some reference grayscale values representatively selected among all grayscale values.

The luminance gamma offset may be a luminance gamma offset with respect to the luminance of white. A correction value of each of color coordinates of inherent single colors (e.g., red, blue, and green) may be determined from the corrected luminance gamma offset of white. A method of calculating color coordinates of the single colors from the color coordinate of white may be performed using various methods known in the art.

Figure 8:
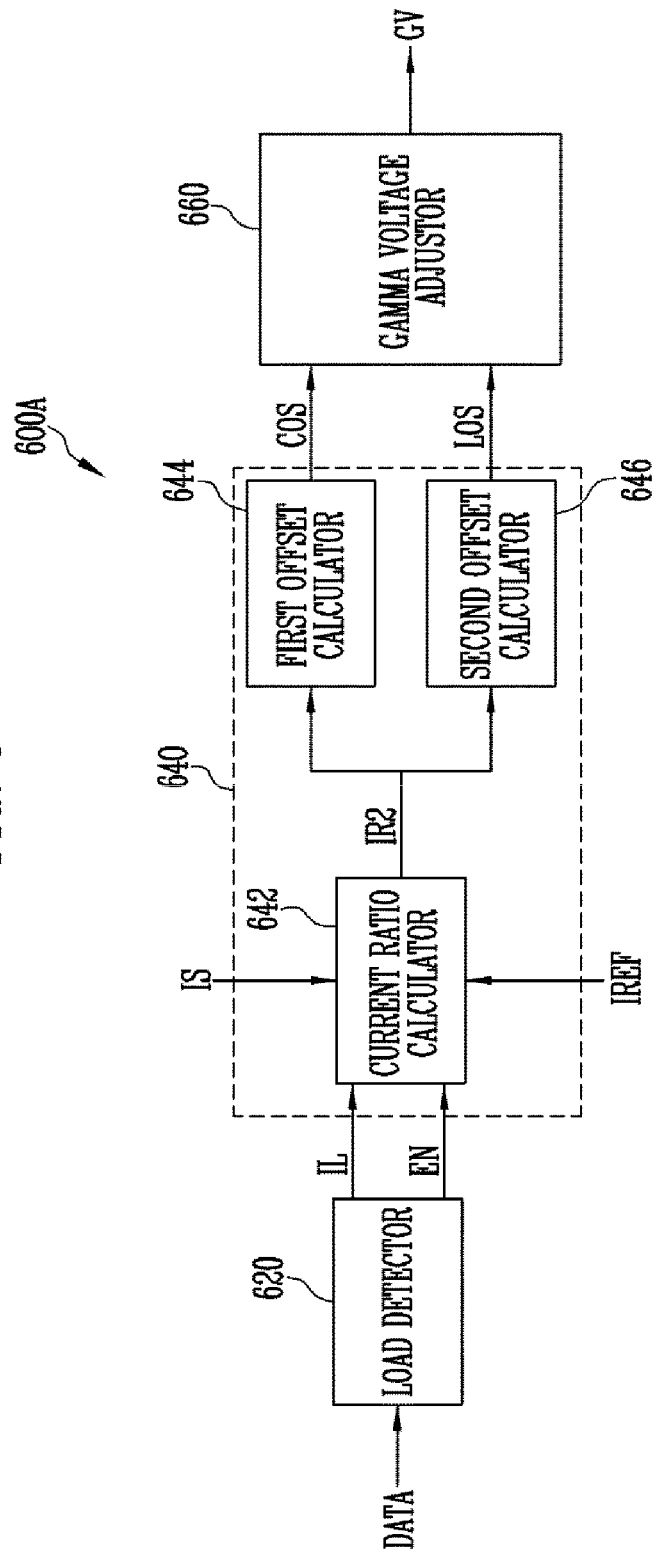
FIG. 8 is a block diagram illustrating an example of a controller included in the display device shown in FIG. 1.

FIG. 8 is a block diagram illustrating an example of the controller included in the display device shown in FIG. 1.

Referring to FIGS. 1 and 5 to 8, a controller 600A may include a load detector 620, an offset determiner 640, and a gamma voltage adjustor 660.

The load detector 620 may detect an image load IL using image data DATA of a frame. For example, the image load IL having the maximum luminance may be 100%, and the image load IL and the current flowing in the second power line PL2 may be decreased when luminance is decreased.

The load detector 620 may determine an image load IL from a total sum or average of image data DATA of one frame.

Also, the load detector 620 may control driving of the offset determiner 640 according to a value of the image load IL. For example, when the current flowing in the second power line PL2 is small, a relative current difference may be derived as a large value despite the minute in difference of the current. The accuracy of luminance and color coordinate correction may be lowered. Therefore, the load detector 620 may drive the offset determiner 640 only when the image load IL is larger than a set or predetermined reference load.

The load detector 620 may compare the image load IL with the reference load. When the image load IL is greater than the reference load, the load detector 620 may provide the offset determiner 640 with an enable signal EN for driving the offset determiner 640. In an example, the reference load may be set to about 65% as compared with the maximum image load.

When the image load IL is the reference load or less, the offset determiner 640 is not driven. That is, color coordinate and luminance compensation driving is not performed.

The offset determiner 640 may determine a color coordinate gamma offset COS and a luminance gamma offset LOS of each of preset reference grayscale values, based on a relative current difference IR2 between a detection value IS of the current flowing in the second power line PL2 and a preset reference current IREF. In an embodiment, the offset determiner 640 may include a current ratio calculator 642, a first offset calculator 644, and a second offset calculator 646.

An initially set gamma voltage corresponding to the reference grayscale value may be a reference gamma voltage. For example, the reference grayscale values may be grayscale values 31, 63, and 127, and the reference gamma voltage may be an initially set gamma voltage of each of the reference grayscale values. However, this is merely illustrative, and the levels of reference grayscale values and the number of reference grayscale values are not limited thereto.

The reference gamma voltage is an ideal gamma voltage with respect to which panel degradation, stress, and the like are not considered. When the color coordinate gamma offset and the luminance gamma offset are applied to the reference gamma voltage, a color coordinate distortion and a change in luminance when the display device is used can be compensated.

The color coordinate gamma offset COS and the luminance gamma offset LOS, which correspond to the change in color coordinate and the change in luminance, respectively, may be derived through a preset mathematical expression, graph, or the like.

The current ratio calculator may calculate a relative current difference IR2 between a reference current IREF corresponding to the image load IL and a detection value IS. When the image load IL becomes larger, the reference current IREF may also increase. The controller 600 may include a memory that stores a relationship between the image load IL and the reference current IREF.

The detection value IS may correspond to the current I flowing in the second power line PL2 when an image of a current frame is displayed.

For example, when the reference current IREF of a set or predetermined image load IL is about 38.4 mA, and the detection value IS is about 41.7 mA, the relative current difference IR2 may be about 8.5%. However, this is merely illustrative, and the relative current difference IR2 may have a negative value. For example, when the detection value IS is smaller than the reference current IREF, a negative relative current difference may be calculated.

The calculated relative current difference IR2 may be provided by the first offset calculator 644 and the second offset calculator 646.

The first offset calculator 644 may set a color coordinate gamma offset COS with respect to each of the reference grayscale values. For example, correction of a color coordinate is performed from a set or predetermined relational expression between the calculated relative current difference IR2 and a reference color coordinate in the reference grayscale value, and a color coordinate gamma offset COS corresponding to the corrected color coordinate may be determined. The color coordinate gamma offset COS corresponding to the corrected color coordinate may be a value pre-stored in a memory or the like.

When the reference grayscale values are grayscale values 31, 63, and 127, corrected color coordinates respectively corresponding to the three reference grayscale values may be calculated. In an embodiment, a method of correcting a color coordinate (x, y) may be derived from the following Equations 1 to 3.

$$x'=x-(x*IR2/k1),\ y'=y-(y*IR2/k2) \qquad \text{Equation 1}$$

$$x'=x-(x*4*IR2/k1),\ y'=y-(y*2*IR2/k2) \qquad \text{Equation 2}$$

$$x'=x-(x*8*IR2/k1),\ y'=y-(y*3*IR2/k2) \qquad \text{Equation 3}$$

Equations 1 to 3 represent color coordinate correction relational expressions in the grayscale values 31, 61, and 127, respectively. In addition, x may be an x-axis reference color coordinate corresponding to a corresponding grayscale value, y may be a y-axis reference color coordinate corresponding to the corresponding grayscale value, x' may be a corrected x-axis color coordinate, y' may be a corrected y-axis color coordinate, and IR2 may be a relative current difference. In addition, k1 and k2 may be correction parameters, which may be experimentally derived.

As shown in FIG. 6, a color coordinate shift amount of the low grayscale value is larger than that of the high gray scale, and therefore, the difference between the value corrected by Equation 3 and the reference color coordinate may be larger than that between the value corrected by Equation 1 and the reference color coordinate.

The first offset calculator 644 may generate a color coordinate gamma offset COS corresponding to the corrected color coordinate (x', y'). The color coordinate shifted by an operation of the first offset calculator 644 may be corrected as a target color coordinate (or reference color coordinate).

The second offset calculator 646 may set a luminance gamma offset LOS with respect to each of the reference grayscale values. For example, correction of a luminance is performed from a set or predetermined relational expression between the calculated relative current difference IR2 and a reference luminance in the reference grayscale value, and a luminance gamma offset LOS corresponding to the corrected luminance may be determined. The luminance gamma offset LOS corresponding to the corrected luminance may be a value pre-stored in a memory or the like.

When the reference grayscale values are grayscale values 31, 63, and 127, corrected color coordinates respectively corresponding to the three reference grayscale values may be calculated. In an embodiment, a method of correcting a luminance may be derived from the following Equation 4.

$$L'=L\_MAX*(G\_REF/G\_MAX)^{2.2}*(1-IR2) \qquad \text{Equation 4}$$

L_MAX may be a maximum luminance, G_REF may be a reference grayscale value, G_MAX may be a maximum grayscale value, IR2 may be a relative current difference, and L' may be a corrected luminance. As shown in Equation 4, when the relative current difference IR2 is a positive number under the same grayscale condition (i.e., current is increased), correction of a luminance may be performed such that the luminance is decreased. When the relative current difference IR2 is a negative number under the same grayscale condition (i.e., current is decreased), correction of a luminance may be performed such that the luminance is increased.

Equation 4 is an example of luminance correction with respect to a 2.2 gamma curve, and a luminance correction relational expression is not limited thereto.

The second offset calculator 646 may generate a luminance gamma offset LOS corresponding to the corrected luminance L' of each reference grayscale value.

Since the color coordinate correction and the luminance correction are performed based on the relative current difference as time passed instead of a difference in amount of current of the display panel, it is unnecessary to detect a current for each grayscale value. Thus, the color coordinate correction and the luminance correction can be performed using a simple method of detecting a current flowing in the second power line PL2 under the condition of a set or predetermined image load IL.

The gamma voltage adjustor 660 may determine gamma voltages GV of all grayscale values, using the color coordinate gamma offset COS and the luminance gamma off set LOS. The gamma voltage adjustor 660 may calculate corrected gamma voltages GV by applying the color coordinate gamma offset COS and the luminance gamma offset LOS to the respective reference gamma voltages. With respect to the other grayscale values, gamma voltages GV may be determined using interpolation or a set or predetermined gamma curve.

However, this is merely illustrative, and a method of determining all gamma voltages, using corrected reference gamma voltages, may be implemented with various gamma voltage setting methods known in the art.

The data driver 300 shown in FIG. 1 may supply data signals (data voltages) corresponding to the gamma voltages GV to the pixels P.

As described above, in the display device including the controller 600A according to the embodiment of the present disclosure, a change in color coordinate and a change in luminance when the display device is used are predicted using a relative current difference IR2 between a current detected from the second power line and an initially set current (or initially detected current), thereby compensating for the color coordinate and the luminance. Thus, the image quality of the display device can be improved, and high image quality can be maintained even when the display device is used for a long time.

Figure 9:
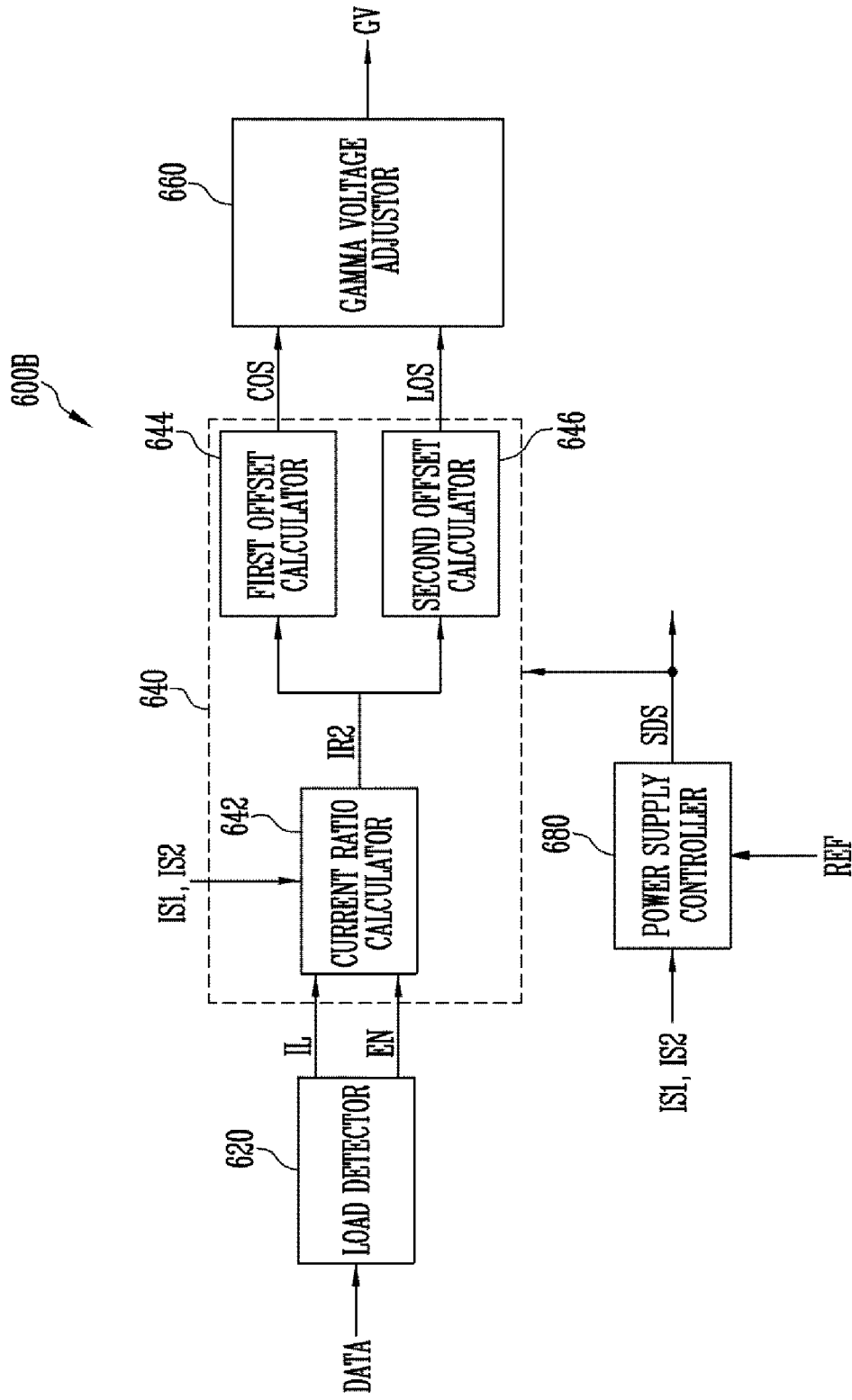
FIG. 9 is a block diagram illustrating an example of a controller included in the display device shown in FIG. 2.

FIG. 9 is a block diagram illustrating an example of the controller included in the display device shown in FIG. 2.

In FIG. 9, components identical to those described with reference to FIGS. 4 and 8 are designated by like reference numerals, and their repeat descriptions may be omitted.

Referring to FIGS. 2, 4, 8, and 9, a controller 600A may include a load detector 620, an offset determiner 640, a gamma voltage adjustor 660, and a power supply controller 680.

In an embodiment, the controller 600B shown in FIG. 9 may be applied to the display device shown in FIG. 2. That is, the sensor 500 may include a first sensor 510 electrically coupled to a first side power line SPL1 and a second sensor 502 electrically coupled to a second side power line SPL2.

In an embodiment, a current ratio calculator 642 may calculate a relative current difference IR2 between a value obtained by a first detection value IS1 and a second detection value IS2 and a reference current. For example, the sum of the first detection value IS1 and the second detection value IS2 may be substantially equal to the detection value IS detected from the sensor 500 shown in FIG. 5.

In an embodiment, the power supply controller 680 may supply a shutdown signal SDS to the offset determiner 640. Driving of the offset determiner 640 may be stopped in response to the shutdown signal SDS.

As described above, the controller 600B controls an operation of the display device and/or the power supply 400, and compensates for a color coordinate distortion and a change in luminance when the use time of the display device elapses. Thus, degradation and damage of the display device can be prevented or reduced, and high image quality can be maintained even when the display device is used for a long time.

Figure 10:
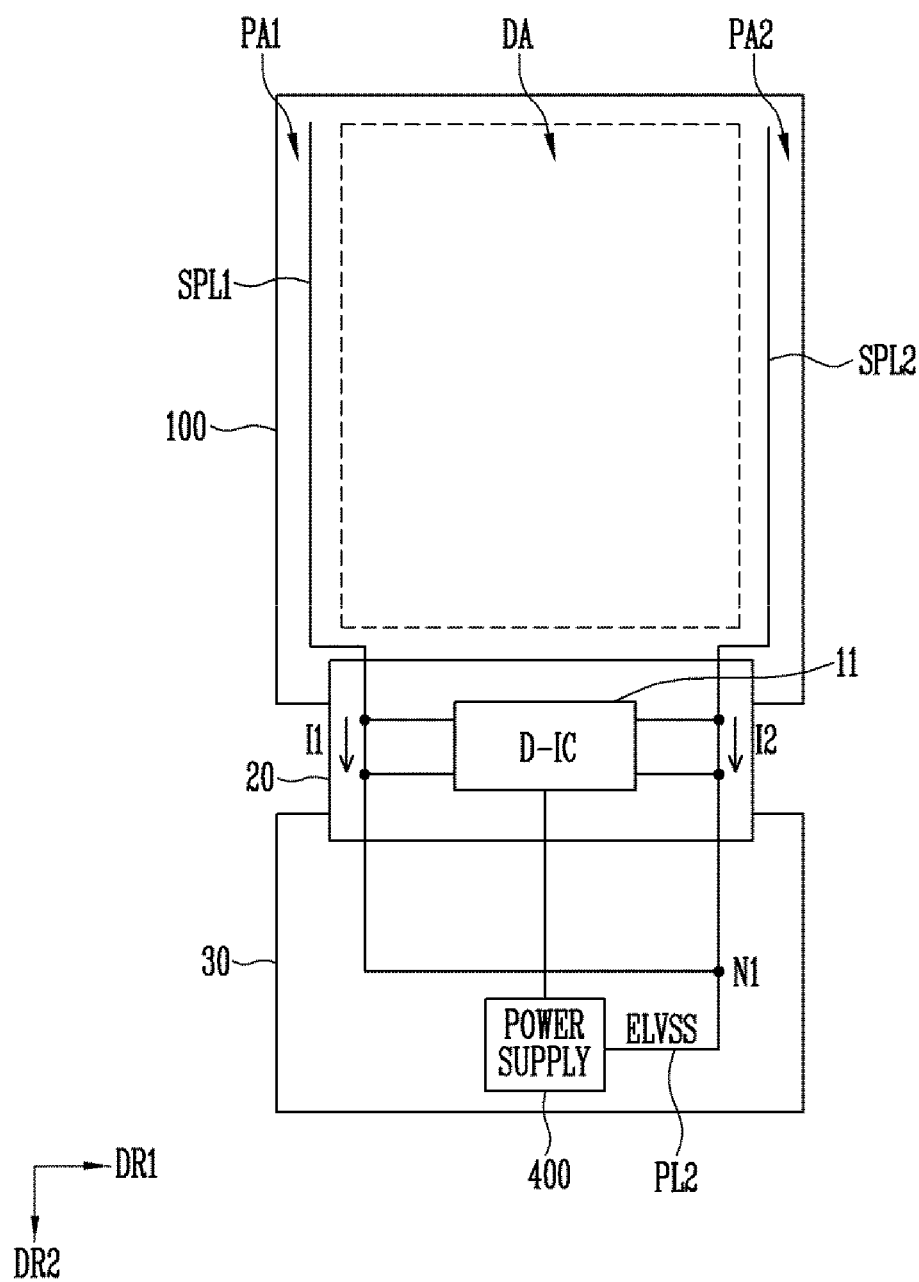
FIG. 10 is a diagram illustrating an example of the display device shown in FIG. 1.

FIG. 10 is a diagram illustrating an example of the display device shown in FIG. 1.

In FIG. 10, components identical to those described with reference to FIGS. 1, 2, and 9 are designated by like reference numerals, and their repeat descriptions may be omitted. In addition, a display device shown in FIG. 10 may have a configuration substantially identical or similar to the display device shown in FIG. 2 or 5, except for the position of a sensor and some functions of a controller.

Referring to FIGS. 1 and 10, a sensor (e.g., 500 shown in FIG. 1) and a controller (e.g., 600 shown in FIG. 1) may be included in a driver IC 11.

The sensor may be electrically coupled to each of a first side power line SPL1 and a second side power line SPL2 on a first substrate 20, to detect a current.

The controller may perform a function of the controller 600B shown in FIG. 9. That is, the controller may control an operation of a power supply 400, based on a difference in current between the first side power line SPL1 and the second side power line SPL2, and compensate for a color coordinate and a luminance, based on a change in sum of currents of the first side power line SPL1 and the second side power line SPL2 (e.g., a relative current difference between a reference current and the sum of currents).

Figure 11:
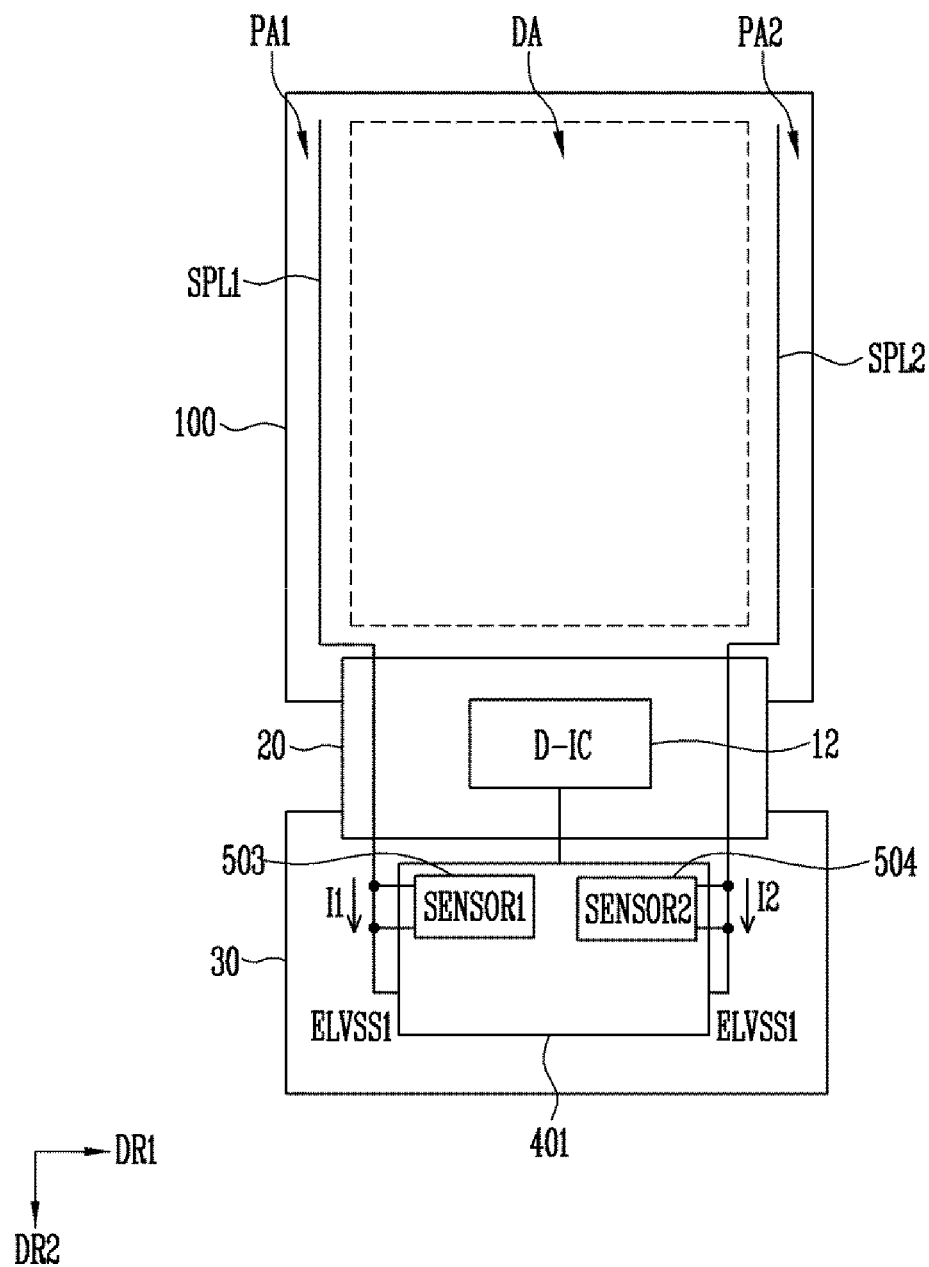
FIG. 11 is a diagram illustrating an example of the display device shown in FIG. 1.

FIG. 11 is a diagram illustrating an example of the display device shown in FIG. 1.

In FIG. 11, components identical to those described with reference to FIGS. 1, 2, and 9 are designated by like reference numerals, and their repeat descriptions may be omitted. In addition, a display device shown in FIG. 11 may have a configuration substantially identical or similar to the display device shown in FIG. 10, except for the position of a sensor and some functions of a power supply.

Referring to FIGS. 1 and 11, first and second sensors 503 and 504 may be included in a power supply 401.

The first and second sensors 503 and 504 may be respectively coupled to a first side power line SPL1 and a second side power line SPL2 in the power supply 401, to detect currents. In an embodiment, the power supply 401 may independently drive a second power source voltage ELVSS1 supplied to the first side power line SPL1 and the second side power line SPL2.

When a defect occurs at one side of a display panel 100, the power supply 401 may supply the second power source voltage ELVSS1 to only one of the first side power line SPL1 and the second side power line SPL2.

FIG. 12 is a flow diagram illustrating an example of a driving method of a display device according to an embodiment of the present disclosure.

Referring to FIGS. 1 to 12, in the driving method of the display device, an image load IL may be detected (S100), and the image load IL and a reference load may be compared (S200). When the image load IL is larger than the reference load, a current (e.g., first detection value IS1) of the first side power line SPL1 of the second power line PL2 and a current (e.g., second detection value IS2) of the second side power line SPL2 of the second power line PL2 may be detected (S300), and a difference IR1 between the first detection value IS1 and the second detection value IS2 may be compared with a reference difference REF (S400). When the difference IR1 is greater than or equal to the reference difference REF, the power supply and/or the display device may be shut down (S500). When the difference IR1 is smaller than the reference difference REF, a color coordinate gamma offset COS and a luminance gamma offset LOS of a reference grayscale value may be determined based on a relative current difference IR2 between the sum of the first detection value IS1 and the second detection value IS2 and a reference current IREF (S600). In addition, gamma voltages of all grayscale values may be determined from gamma voltages of the reference grayscale value, to which the color coordinate gamma offset COS and the luminance gamma offset LOS are applied (S700).

As described above, in the display device and driving method thereof according to the embodiment of the present disclosure, the display device is protected by shutting down the display device and/or the power supply, based on a current difference between positions of current, and a color coordinate distortion and a change in luminance when the use time of the display device elapses are compensated. Thus, degradation and damage of the display device can be prevented or reduced, and high image quality can be maintained even when the display device is used for a long time.

In the display device according to the present disclosure, shutdown of the power supply and/or the display device is controlled based on a current difference between positions of the second power line. Thus, asymmetric degradation of the display panel due to current asymmetry can be prevented or reduced, and breakdown and damage of the display device can be prevented or reduced.

Further, the display device according to example embodiments may predict a change in color coordinate and a change in luminance due to a use of the display device and may compensate the color coordinate and the luminance using a relative current difference between a current detected from the second power line and an initially set current (or initially detected current). Thus, the image quality of the display device can be improved, and high image quality can be maintained even when the display device is used for a long time.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

It will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art. As used herein, the terms "use," "using," and "used" may be considered synonymous with the terms "utilize," "utilizing," and "utilized," respectively.

The display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Example embodiments have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as defined by the following claims and equivalents thereof.

What is claimed is:

1. A display device comprising:
    a display panel having a display area and comprising a plurality of pixels at the display area;
    a power supply configured to supply a first power source voltage to the pixels through a first power line extending to the display area, and to supply a second power source voltage lower than the first power source voltage to the pixels through a second power line comprising a first side power line extending in a first peripheral area located at a first side of the display area of the display panel and a second side power line extending in a second peripheral area located at a second side of the display area of the display panel;

a sensor configured to detect a first detection value and a second detection value, the first detection value being a current of the first side power line and the second detection value being a current of the second side power line; and a controller configured to control an operation of the power supply, based on a difference between the first detection value and the second detection value.

2. The display device of claim 1, wherein the controller comprises:

a power supply controller configured to shut down the power supply, when the difference between the first detection value and the second detection value exceeds a reference difference.

3. The display device of claim 1, wherein the controller is provided on a first substrate overlapping with a portion of the display panel, and the power supply is provided on a second substrate overlapping with a portion of the first substrate.

4. The display device of claim 3, wherein the second power line branches off into the first side power line and the second side power line on the second substrate.

5. The display device of claim 4, wherein the sensor is on the first substrate or the second substrate.

6. The display device of claim 5, wherein the sensor comprises:

a first sensor electrically coupled to the first side power line, and configured to detect the first detection value; and a second sensor electrically coupled to the second side power line, and configured to detect the second detection value.

7. The display device of claim 1, wherein the controller is configured to change a gamma setting, based on a relative current difference between a reference current and a sum of the first detection value and the second detection value.

8. The display device of claim 7, wherein the controller comprises:

a load detector configured to detect an image load based on image data of one frame;

an offset determiner configured to determine a color coordinate gamma offset and a luminance gamma offset of each of reference grayscale values, based on the relative current difference; and a gamma voltage adjustor configured to determine gamma voltages of all grayscale values based on the color coordinate gamma offset and the luminance gamma offset.

9. The display device of claim 8, wherein the offset determiner comprises:

a current ratio calculator configured to calculate the relative current difference based on the reference current corresponding to the image load and the second detection value;

a first offset calculator configured to calculate the color coordinate gamma offset by applying the relative current difference to a current color coordinate corresponding to each of the reference grayscale values; and a second offset calculator configured to calculate the luminance gamma offset by applying the relative current difference to a current luminance corresponding to each of the reference grayscale values.

10. The display device of claim 8, wherein the load detector compares the image load with a reference load, and drives the offset determiner when the image load is larger than the reference load.

11. A display device comprising:

a display panel having a display area and comprising a plurality of pixels at the display area;

a power supply configured to supply a first power source voltage to the pixels through a first power line, and supply a second power source voltage lower than the first power source voltage to the pixels through a second power line;

a sensor configured to detect a current of the second power line;

a data driver configured to supply a data signal to the pixels; and a controller configured to change a gamma setting corresponding to the data signal, based on a relative current difference between a reference current and the detected current, and to control an operation of the power supply, based on a current difference between positions of the detected current.

12. The display device of claim 11, wherein the second power line comprises:

a first side power line extending in a first peripheral area located at a first side of the display area of the display panel; and a second side power line extending in a second peripheral area located at a second side of the display area of the display panel.

13. The display device of claim 12, wherein the display area is located between the first peripheral area and the second peripheral area.

14. The display device of claim 12, wherein the sensor comprises:

a first sensor electrically coupled to the first side power line, and configured to detect a first detection value, the first detection value being a current of the first side power line; and a second sensor electrically coupled to the second side power line and configured to detect a second detection value, the second detection value being a current of the second side power line.

15. The display device of claim 14, wherein the controller comprises:

a power supply controller configured to shut down the power supply, when a difference between the first detection value and the second detection value exceeds a reference difference.

16. The display device of claim 11, wherein the controller comprises:

a load detector configured to detect an image load based on image data of one frame;

an offset determiner configured to determine a color coordinate gamma offset and a luminance gamma offset of each of reference grayscale values, based on the relative current difference; and a gamma voltage adjustor configured to determine gamma voltages of all grayscale values based on the color coordinate gamma offset and the luminance gamma offset of each of reference grayscale values.

17. The display device of claim 16, wherein the offset determiner comprises:

a current ratio calculator configured to calculate the relative current difference based on the reference current corresponding to the image load and the detected current;

a first offset calculator configured to calculate the color coordinate gamma offset by applying the relative current difference to a current color coordinate corresponding to each of the reference grayscale values; and
a second offset calculator configured to calculate the luminance gamma offset by applying the relative current difference to a current luminance corresponding to each of the reference grayscale values.

* * * * *